(12) United States Patent
Kovarik et al.

(10) Patent No.: US 12,445,079 B2
(45) Date of Patent: Oct. 14, 2025

(54) MOTOR CONTROL SYSTEM FOR ENERGIZING A LOW-VOLTAGE MOTOR FROM A HIGH-VOLTAGE SOURCE

(71) Applicant: HONEYWELL INTERNATIONAL INC., Charlotte, NC (US)

(72) Inventors: Martin Kovarik, Brno (CZ); Roman Kostka, Brno (CZ); Michal Vavrda, Brno (CZ)

(73) Assignee: HONEYWELL INTERNATIONAL, INC., Charlotte, NC (US)

( * ) Notice: Subject to any disclaimer, the term of this patent is extended or adjusted under 35 U.S.C. 154(b) by 144 days.

(21) Appl. No.: 18/487,641

(22) Filed: Oct. 16, 2023

(65) Prior Publication Data
US 2025/0125760 A1    Apr. 17, 2025

(51) Int. Cl.
*H02P 6/08* (2016.01)
*B60L 15/08* (2006.01)
(Continued)

(52) U.S. Cl.
CPC ............ *H02P 27/085* (2013.01); *B60L 15/08* (2013.01); *H02P 6/08* (2013.01)

(58) Field of Classification Search
CPC .......... H02P 27/085; H02P 27/08; H02P 6/08; H02M 1/44; H02M 1/126; H02M 7/5395; B60L 15/08
(Continued)

(56) References Cited

U.S. PATENT DOCUMENTS

| | | |
|---|---|---|
| 5,541,488 A | 7/1996 | Bansal et al. |
| 6,262,896 B1 | 7/2001 | Stancu et al. |
| (Continued) | | |

FOREIGN PATENT DOCUMENTS

CN    214380727 U    10/2021

OTHER PUBLICATIONS

XP032133504; Bonnett A N; "Insulation systems available for PWM inverter fed motors for low voltage pulp and paper applications"; Pulp and Paper Industry Technical Conference; Annual Cincinnati, OH; USA Jun. 16-20, 1997; New York, NY, USA, IEE, Jun. 16, 1997; pp. 17-28; DOI: 10.1109*Papcon.1997.595207 ISBN: 978-0-7803-3919-4.

(Continued)

*Primary Examiner* — Gabriel Agared
(74) *Attorney, Agent, or Firm* — Ingrassia Fisher & Lorenz, LLP

(57) ABSTRACT

A motor control system includes a voltage source, a multi-phase motor, and a motor control circuit. The voltage source supplies a voltage at a maximum voltage magnitude. The multi-phase motor has a motor voltage rating that is less than the maximum voltage magnitude. The motor control circuit is coupled to the voltage source and to the multi-phase stator and is configured to energize each phase of the multi-phase stator with a voltage having a peak magnitude at or below the motor voltage rating voltage. The motor control circuit includes a multi-phase inverter, a multi-phase output filter circuit, and a duty-cycle control circuit. The duty-cycle control signal supplied by the duty-cycle control circuit and the multiphase output filter ensure that the peak magnitude of the voltage supplied to each phase of the multi-phase stator is at or below the motor voltage rating.

16 Claims, 3 Drawing Sheets

(51) Int. Cl.
*H02M 1/44* (2007.01)
*H02P 27/08* (2006.01)

(58) Field of Classification Search
USPC .......................................................... 318/811
See application file for complete search history.

(56) References Cited

U.S. PATENT DOCUMENTS

| | | |
|---|---|---|
| 6,351,090 B1 | 2/2002 | Boyer et al. |
| 8,497,646 B2 | 7/2013 | Yamada et al. |
| 8,558,501 B2 | 10/2013 | Tsunematsu et al. |
| 10,097,092 B1* | 10/2018 | Ho .................... H02M 3/1584 |
| 10,128,758 B1* | 11/2018 | Price ..................... H02J 1/102 |
| 11,043,891 B1* | 6/2021 | Cheung ................ H02M 1/084 |
| 2010/0315052 A1* | 12/2010 | Zambetti ............ H02M 3/1584 |
| | | 323/282 |
| 2011/0025240 A1* | 2/2011 | Furukawa ........... H02M 7/5395 |
| | | 318/400.3 |
| 2015/0349694 A1 | 12/2015 | Feng et al. |
| 2018/0294761 A1* | 10/2018 | Yamamoto ................ H02P 6/08 |
| 2020/0059190 A1* | 2/2020 | Kim .................... H02M 7/5395 |
| 2021/0408890 A1* | 12/2021 | Sun .................... H02M 1/0019 |

OTHER PUBLICATIONS

XP011022260; Autin H Bonnett; "A comparison between insulation systems available for PWM-Inverter-Fed Motors"; IEEE transactions on industry applications, IEEE service center Piscataway, NJ, US vol. 33 No 55; Oct. 1, 1997 ISSN: 0093-9994.

\* cited by examiner

MOTOR CONTROL SYSTEM FOR ENERGIZING A LOW-VOLTAGE MOTOR FROM A HIGH-VOLTAGE SOURCE

TECHNICAL FIELD

The present disclosure generally relates to motor control systems and, more particularly, to a motor control system that allows energizing a low-voltage motor from a high-voltage source.

BACKGROUND

Many vehicles, including many aircraft, are equipped with relatively high-voltage direct current (DC) power sources. For example, many aircraft include voltage sources that supply voltages in the range of 450-900 VDC. The voltage sources are very safe and reliable. However, one potential challenge, especially in the aerospace industry, is that electric motors that are rated for these voltages can be relatively large and heavy, which can adversely impact flight costs.

In addition, these motors can also be costly to manufacture due, at least in part, to the requirements on isolation and dielectric strength of the materials used within the motor, not just due to the voltage rating of the motor, but also high-voltage corona discharge and partial discharge effects. In particular, at high altitudes, where the air pressure is lower, the dielectric breakdown voltage of the material is lower, and the partial discharge effect can cause thermal and chemical degradation of isolation materials resulting in unpredictable and deleterious effects.

Hence, it is desirable to provide a way of using motors with lower voltage ratings, while still retaining the relatively high-voltage power sources. The present disclosure addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a motor control system includes a voltage source, a multi-phase motor, and a motor control circuit. The voltage source is configured to supply a voltage at a maximum voltage magnitude. The multi-phase motor has a motor voltage rating that is less than the maximum voltage magnitude. The multi-phase motor includes a multi-phase stator and a rotor, and each phase of the multi-phase stator is configured to be energized to thereby generate a rotating magnetic field that causes the rotor to rotate. The motor control circuit is coupled to the voltage source and to each phase of the multi-phase stator. The motor control circuit is configured to energize each phase of the multi-phase stator with a voltage having a peak magnitude at or below the motor voltage rating voltage. The motor control circuit includes a multi-phase inverter, a multi-phase output filter circuit, and a duty-cycle control circuit. The multi-phase inverter is coupled to the voltage source and is coupled to receive a duty-cycle control signal. The multi-phase inverter is configured, in response to the duty-cycle control signal, to generate a plurality of pulse-width-modulated (PWM) voltages, where each PWM voltage has a magnitude based on the duty-cycle control signal. The multi-phase output filter circuit is coupled to receive the PWM voltages and is configured to supply the voltage to each phase of the multi-phase stator. The duty-cycle control circuit is configured to generate and supply the duty-cycle control signal. The duty-cycle control signal and the multi-phase output filter ensure that the peak magnitude of the voltage supplied to each phase of the multi-phase stator is at or below the motor voltage rating.

In another embodiment, an actuation control system includes an actuator, a voltage source, a multi-phase motor, and a motor control circuit. The actuator is coupled to receive a drive torque and, upon receipt of the drive torque, to move to an actuator position. The voltage source is configured to supply a voltage at a maximum voltage magnitude. The multi-phase motor has a motor voltage rating that is less than the maximum voltage magnitude. The multi-phase motor includes a multi-phase stator and a rotor. The rotor is coupled to the actuator, and each phase of the multi-phase stator is configured to be energized to thereby generate a rotating magnetic field that causes the rotor to rotate and supply the drive torque to the actuator. The motor control circuit is coupled to the voltage source and to each phase of the multi-phase stator. The motor control circuit is configured to energize each phase of the multi-phase stator with a voltage having a peak magnitude at or below the motor voltage rating voltage. The motor control circuit includes a multi-phase inverter, a multi-phase output filter circuit, and a duty-cycle control circuit. The multi-phase inverter is coupled to the voltage source and is coupled to receive a duty-cycle control signal. The multi-phase inverter is configured, in response to the duty-cycle control signal, to generate a plurality of pulse-width-modulated (PWM) voltages, where each PWM voltage has a magnitude based on the duty-cycle control signal. The multi-phase output filter circuit is coupled to receive the PWM voltages and is configured to supply the voltage to each phase of the multi-phase stator. The duty-cycle control circuit is configured to generate and supply the duty-cycle control signal. The duty-cycle control signal and the multiphase output filter ensure that the peak magnitude of the voltage supplied to each phase of the multi-phase stator is at or below the motor voltage rating.

In yet another embodiment, an aircraft system includes an aircraft, a voltage source, a multi-phase motor, and a motor control circuit. The voltage source is disposed within the aircraft and is configured to supply a voltage at a maximum voltage magnitude. The multi-phase motor is disposed within the aircraft and has a motor voltage rating that is less than the maximum voltage magnitude. The multi-phase motor includes a multi-phase stator and a rotor, and each phase of the multi-phase stator is configured to be energized to thereby generate a rotating magnetic field that causes the rotor to rotate. The motor control circuit is disposed within the aircraft and is coupled to the voltage source and to each phase of the multi-phase stator. The motor control circuit is configured to energize each phase of the multi-phase stator with a voltage having a peak magnitude at or below the motor voltage rating voltage. The motor control circuit includes a multi-phase inverter, a multi-phase output filter circuit, and a duty-cycle control circuit. The multi-phase inverter is coupled to the voltage source and is coupled to receive a duty-cycle control signal. The multi-phase inverter is configured, in response to the duty-cycle control signal, to generate a plurality of pulse-width-modulated (PWM) voltages, where each PWM voltage has a magnitude based on the duty-cycle control signal. The multi-phase output filter circuit is coupled to receive the PWM voltages and is configured to supply the voltage to each phase of the multi-phase stator. The duty-cycle control circuit is configured to generate and supply the duty-cycle control signal. The duty-cycle control signal and the multiphase output filter ensure that the peak magnitude of the voltage supplied to each phase of the multi-phase stator is at or below the motor voltage rating.

Furthermore, other desirable features and characteristics of the motor control systems will become apparent from the subsequent detailed description and the appended claims, taken in conjunction with the accompanying drawings and the preceding background.

BRIEF DESCRIPTION OF DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
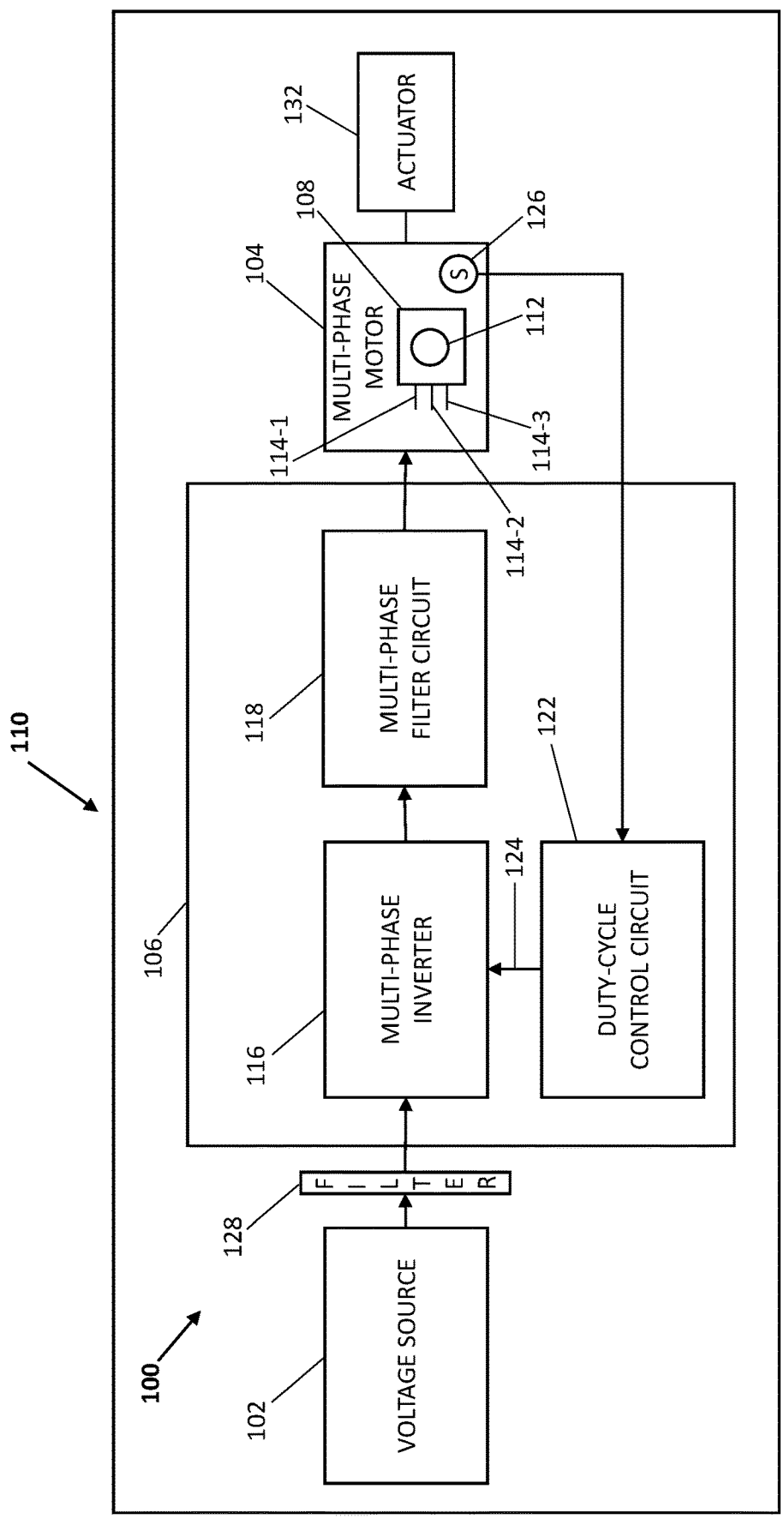
FIG. 1 depicts a functional block diagram of one embodiment of a motor control system.
Figure 2:
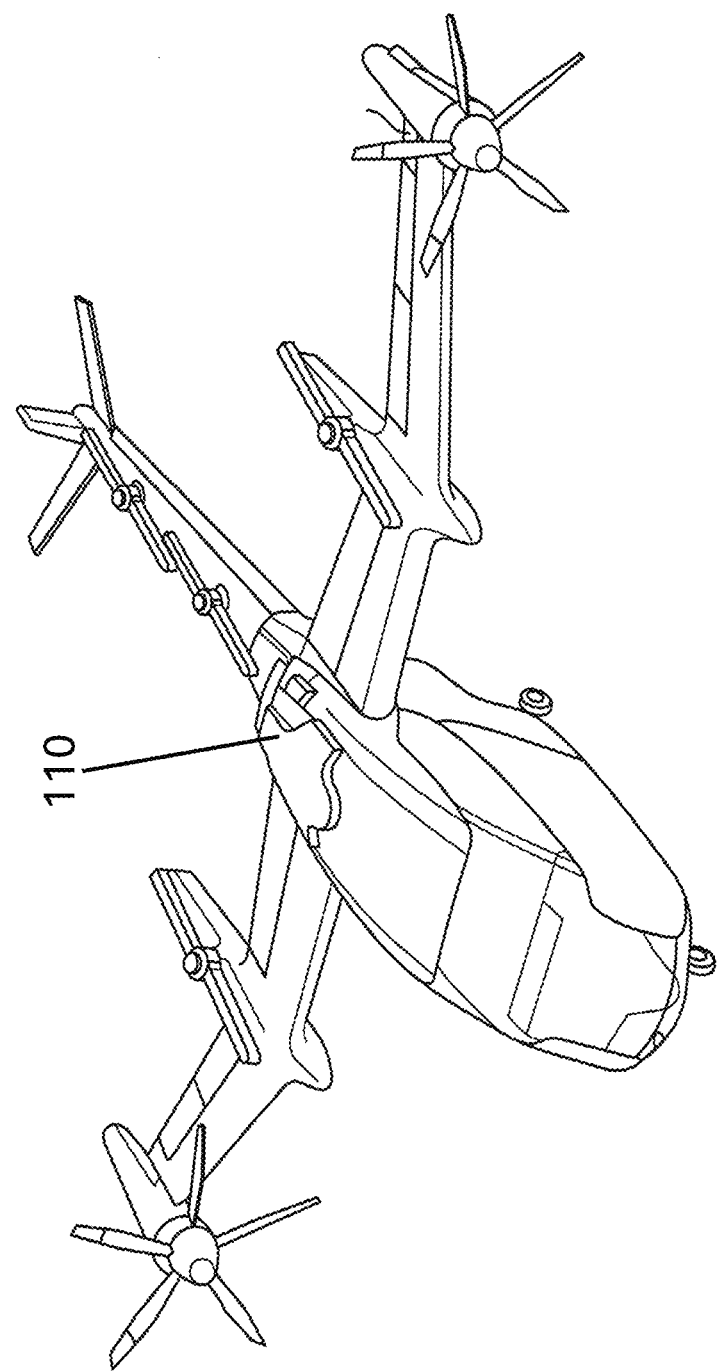
FIG. 2 depicts a perspective view of one embodiment of an aircraft.

Referring first to FIG. 1, a functional block diagram of one embodiment of a motor control system 100 is depicted and includes a voltage source 102, a multi-phase motor 104, and a motor control circuit 106. Before proceeding further, it is noted that the depicted motor control system 100 is disposed within a vehicle 110. Although the configuration of the vehicle 110 may vary, in one particular embodiment the vehicle 110 is an aircraft, such as the example aircraft 110 depicted in FIG. 2. It should be further noted that although the aircraft 110 depicted in FIG. 2 is configured as an Urban Air Mobility (UAM) aircraft, it could be configured as any one of numerous other types of aircraft.

Returning now to a description of the motor control system 100, the voltage source 102 is configured to supply a voltage at a maximum voltage magnitude, and the multi-phase motor 104 has a motor voltage rating that is less than the maximum voltage magnitude. Although the relative values of the maximum voltage magnitude and the motor voltage rating may vary, the maximum voltage magnitude of the voltage source 102 is at least two times the motor voltage rating. In one particular embodiment, the value of the maximum voltage magnitude is in a range of about 450 VDC to about 900 VDC, and the value of the motor voltage rating is less than about 300 VAC.

The multi-phase motor 104, as is generally known, includes a multi-phase stator 108 and a rotor 112. In the depicted embodiment, the multi-phase stator 108 is implemented as a three-phase stator, and thus includes three phases 114-1, 114-2, 114-3. It will be appreciated, however, that in other embodiments, the multi-phase stator 108 could be implemented with more than this number of phases.

Regardless of the specific number of phases 114, each phase of the multi-phase stator 108 is configured to be energized to thereby generate a rotating magnetic field. As is generally known, the rotating magnetic field in turn causes the rotor 112 to rotate and supply a drive torque.

The motor control circuit 106 is coupled to the voltage source 102 and to each phase 114 of the multi-phase stator 108. The motor control circuit 106 is configured to energize each phase 114 of the multi-phase stator 108 with a voltage, thereby generating the rotating magnetic field. The voltage supplied by the motor control circuit 106 has a peak magnitude that is at or below the motor voltage rating voltage. To implement this functionality, and as FIG. 1 further depicts, the motor control circuit 106 includes a multi-phase inverter 116, a multi-phase output filter 118, and a duty-cycle control circuit 122.

Figure 3:
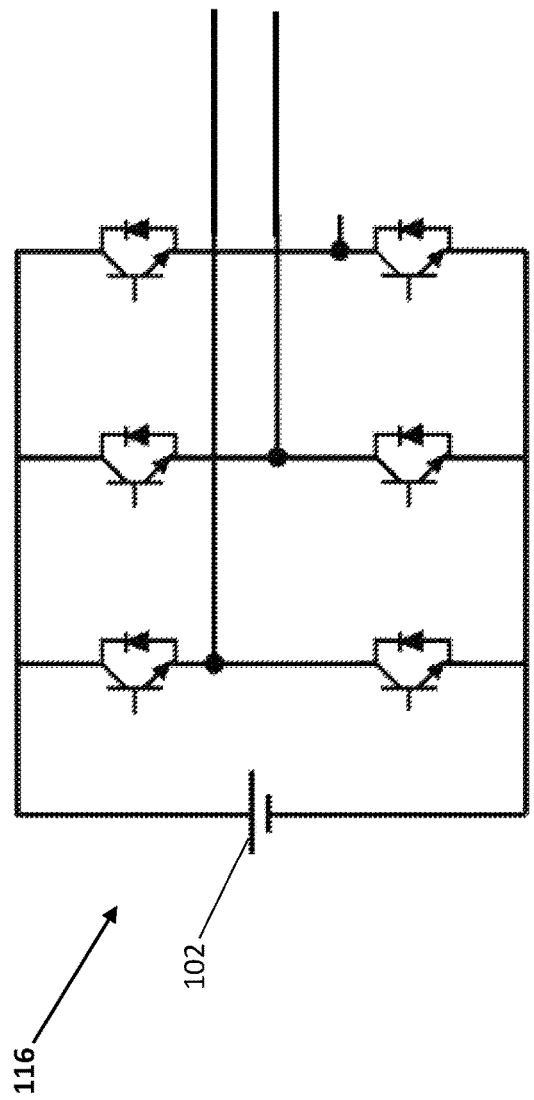
FIG. 3 depicts a schematic diagram of one embodiment of a multi-phase inverter.

The multi-phase inverter 116 is coupled to the voltage source 102 and is additionally coupled to receive a duty-cycle control signal 124. The multi-phase inverter 116 is configured, in response to the duty-cycle control signal, and using known techniques, to generate a plurality of pulse-width-modulated (PWM) voltages. Specifically, the multi-phase inverter 116 is configured such that each PWM voltage has a magnitude that is based on the duty-cycle control signal 124. It will be appreciated that the multi-phase inverter 116 may be implemented using any one of numerous known inverter circuit topologies. In one embodiment, such as the one depicted in FIG. 3, the multi-phase inverter 116 is implemented using a 3-phase inverter.

Figure 4:
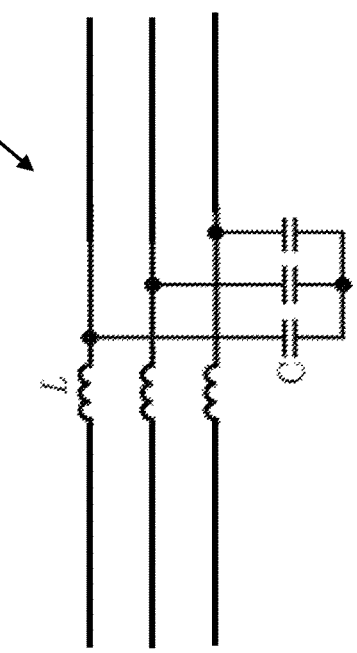
FIG. 4 depicts a schematic diagram of one embodiment of a multi-phase LC filter circuit.

The multi-phase output filter circuit 118 is coupled to receive the PWM voltages supplied by the multi-phase inverter 116 and is configured to supply the voltage to each phase 114 of the multi-phase stator 108. Although the multi-phase output filter circuit 118 may be variously implemented, in one particular embodiment, it is implemented as a multi-phase inductor-capacitor (LC) filter circuit. One example embodiment of a suitable multi-phase LC filter circuit 400 is depicted in FIG. 4.

The duty-cycle control circuit 122 is configured to generate and supply the duty-cycle control signal 124 to the multi-phase inverter 116. Depending on the embodiment, the duty-cycle control circuit 122 may be implemented or realized with a general purpose processor, a controller, a microprocessor, a microcontroller, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. In practice, the duty-cycle control circuit 122 includes processing logic that may be configured to carry out the functions, techniques, and processing tasks associated with the operation of the motor control system 100, as described herein. Furthermore, the steps of a method or algorithm described in connection with the embodiments disclosed herein may be embodied directly in hardware, in firmware, in a software module executed by the duty-cycle control circuit 122, or in any practical combination thereof. In accordance with one or more embodiments, the duty-cycle control circuit 122 includes or otherwise accesses a data storage element, such as a memory (e.g., RAM memory, ROM memory, flash memory, registers, a hard disk, or the like) or another suitable non-transitory short or long term storage media capable of storing computer-executable programming instructions or other data for execution that, when read and executed by the duty-cycle control circuit 122, cause the duty-cycle control circuit 122 to execute and perform its functions.

In exemplary embodiments, computer-executable programming instructions are executed by the processor, control module, or other hardware associated with the duty-cycle control circuit 122 and cause the duty-cycle control circuit 122 to generate the duty-cycle control signal 124 such that the duty-cycle control signal 124, together with the multiphase output filter 118, ensures the peak magnitude of the voltage supplied to each phase 114 of the multi-phase stator 108 is at or below the motor voltage rating.

It will be appreciated that in some embodiments, the duty-cycle control signal 124 generated by the duty-cycle control circuit 122 may also adjust the PWM voltages supplied by the multi-phase inverter 116 to control the rotational speed of the multi-phase motor 104. Thus, as FIG. 1 additionally depicts, the motor control system 100 may, in such embodiments, additionally include a rotational speed and/or position sensor 126 that is configured to sense the rotational speed and/or position of the multi-phase motor 104 and supply a speed and/or position signal representative thereof to the duty-cycle control circuit 122. In such embodiments, the duty-cycle control signal 124, while adjusting the PWM voltages to control motor speed, additionally ensures, together with the with the multiphase output filter 118, that the peak magnitude of the voltage supplied to each phase 114 of the multi-phase stator 108 is at or below the motor voltage rating.

As FIG. 1 further depicts, the motor control system 100 may, at least in the depicted embodiment, additionally include an input filter 128. The input filter 128, when included, is coupled between the voltage source 102 and the motor control circuit 106. The input filter 128 is configured to at least reduce electromagnetic interference (EMI) that may be present in the voltage supplied from the voltage source 102.

The multi-phase motor 108 may be used to drive various loads. In the depicted embodiment, it is used to drive an actuator 132. The actuator 132, which may be coupled to any one of numerous devices, such as a valve, a flight control surface, or landing gear, just to name a few, is coupled to the rotor 112 of the multi-phase motor 108, to thereby receive the drive torque from the rotor 112 when the rotor 112 rotates. Although the actuator 132 is depicted separate from the multi-phase motor 104 in FIG. 1, it will be appreciated that this is done merely for clarity, and that in some embodiments, the multi-phase motor 104 may be implemented as one of the internal parts of the actuator 132. Moreover, while not depicted in FIG. 1, the actuator 132 may also include other components, such as gearing, an output shaft, a brake, and a position sensor, just to name a few.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A motor control system, comprising:
   a voltage source configured to supply a voltage at a maximum voltage magnitude;
   a multi-phase motor having a motor voltage rating that is less than the maximum voltage magnitude, the multi-phase motor including a multi-phase stator and a rotor, each phase of the multi-phase stator configured to be energized to thereby generate a rotating magnetic field that causes the rotor to rotate; and
   a motor control circuit coupled to the voltage source and to each phase of the multi-phase stator, the motor control circuit configured to energize each phase of the multi-phase stator with a voltage having a peak magnitude at or below the motor voltage rating voltage, the motor control circuit including:
      a multi-phase inverter coupled to the voltage source and coupled to receive a duty-cycle control signal, the multi-phase inverter configured, in response to the duty-cycle control signal, to generate a plurality of pulse-width-modulated (PWM) voltages, each PWM voltage having a magnitude based on the duty-cycle control signal,
      a multi-phase output filter circuit coupled to receive the PWM voltages and configured to supply the voltage to each phase of the multi-phase stator, and
      a duty-cycle control circuit configured to generate and supply the duty-cycle control signal,
      wherein the duty-cycle control signal and multiphase output filter ensure the peak magnitude of the voltage supplied to each phase of the multi-phase stator is at or below the motor voltage rating.

2. The motor control system of claim 1, wherein the multi-phase output filter circuit comprises an inductor-capacitor (LC) filter.

3. The motor control system of claim 1, wherein the maximum voltage magnitude of the voltage source is in a range of about 450 VDC to about 900 VDC.

4. The motor control system of claim 3, wherein the motor voltage rating of the multi-phase motor is less than about 300 VAC.

5. The motor control system of claim 1, further comprising an input filter coupled between the voltage source and the motor control circuit, the input filter configured to at least reduce electromagnetic interference.

6. An actuation control system, comprising:
   an actuator coupled to receive a drive torque and, upon receipt of the drive torque, to move to an actuator position;
   a voltage source configured to supply a voltage at a maximum voltage magnitude;
   a multi-phase motor having a motor voltage rating that is less than the maximum voltage magnitude, the multi-phase motor including a multi-phase stator and a rotor, the rotor coupled to the actuator, each phase of the multi-phase stator configured to be energized to thereby generate a rotating magnetic field that causes the rotor to rotate and supply the drive torque to the actuator; and
   a motor control circuit coupled to the voltage source and to each phase of the multi-phase stator, the motor control circuit configured to energize each phase of the multi-phase stator with a voltage having a peak magnitude at or below the motor voltage rating, the motor control circuit including:
  a multi-phase inverter coupled to the voltage source and coupled to receive a duty-cycle control signal, the multi-phase inverter configured, in response to the duty-cycle control signal, to generate a plurality of pulse-width-modulated (PWM) voltages, each PWM voltage having a magnitude based on the duty-cycle control signal,
  a multi-phase output filter circuit coupled to receive the PWM voltages and configured to supply the voltage to each phase of the multi-phase stator, and
  a duty-cycle control circuit configured to generate and supply the duty-cycle control signal,
  wherein the duty-cycle control signal and multiphase output filter ensure the peak magnitude of the voltage supplied to each phase of the multi-phase stator is at or below the motor voltage rating.

7. The actuation control system of claim 6, wherein the multi-phase output filter circuit comprises an inductor-capacitor (LC) filter.

8. The actuation control system of claim 6, wherein the maximum voltage magnitude of the voltage source is in a range of about 450 VDC to about 900 VDC.

9. The actuation control system of claim 8, wherein the motor voltage rating of the multi-phase motor is less than about 300 VAC.

10. The actuation control system of claim 6, further comprising an input filter coupled between the voltage source and the motor control circuit, the input filter configured to at least reduce electromagnetic interference.

11. An aircraft system, comprising:
  an aircraft;
  a voltage source disposed within the aircraft and configured to supply a voltage at a maximum voltage magnitude;
  a multi-phase motor disposed within the aircraft and having a motor voltage rating that is less than the maximum voltage magnitude, the multi-phase motor including a multi-phase stator and a rotor, each phase of the multi-phase stator configured to be energized to thereby generate a rotating magnetic field that causes the rotor to rotate; and
  a motor control circuit disposed within the aircraft, the motor control circuit coupled to the voltage source and to each phase of the multi-phase stator, the motor control circuit configured to energize each phase of the multi-phase stator with a voltage having a peak magnitude at or below the motor voltage rating voltage, the motor control circuit including:
    a multi-phase inverter coupled to the voltage source and coupled to receive a duty-cycle control signal, the multi-phase inverter configured, in response to the duty-cycle control signal, to generate a plurality of pulse-width-modulated (PWM) voltages, each PWM voltage having a magnitude based on the duty-cycle control signal,
    a multi-phase output filter circuit coupled to receive the PWM voltages and configured to supply the voltage to each phase of the multi-phase stator, and
    a duty-cycle control circuit configured to generate and supply the duty-cycle control signal,
    wherein the duty-cycle control signal and multiphase output filter ensure the peak magnitude of the voltage supplied to each phase of the multi-phase stator is at or below the motor voltage rating.

12. The aircraft of claim 11, further comprising:
  an actuator coupled to the rotor of the multiphase motor to thereby receive a drive torque from the rotor when the rotor rotates.

13. The aircraft of claim 11, wherein the multi-phase output filter circuit comprises an inductor-capacitor (LC) filter.

14. The aircraft of claim 11, wherein the maximum voltage magnitude of the voltage source is in a range of about 450 VDC to about 900 VDC.

15. The aircraft of claim 14, wherein the motor voltage rating of the multi-phase motor is less than about 300 VAC.

16. The aircraft of claim 13, further comprising an input filter coupled between the voltage source and the motor control circuit, the input filter configured to at least reduce electromagnetic interference.

* * * * *